United States Patent
Alaküla (10) Patent No.: US 8,932,517 B2
(45) Date of Patent: Jan. 13, 2015

(54) POWDER BASED SOFT MAGNETIC INDUCTIVE COMPONENT, AND A METHOD AND A DEVICE FOR PRODUCTION THEREOF

(75) Inventor: Mats Alaküla, Lund (SE)

(73) Assignee: Magnetic Components Sweden AB, Eslöv (SE)

( * ) Notice: Subject to any disclaimer, the term of this patent is extended or adjusted under 35 U.S.C. 154(b) by 949 days.

(21) Appl. No.: 12/738,030

(22) PCT Filed: Oct. 16, 2008

(86) PCT No.: PCT/SE2008/051184
§ 371 (c)(1),
(2), (4) Date: May 7, 2010

(87) PCT Pub. No.: WO2009/051559
PCT Pub. Date: Apr. 23, 2009

(65) Prior Publication Data
US 2010/0219928 A1  Sep. 2, 2010

(30) Foreign Application Priority Data

Oct. 16, 2007  (SE) .................. 0702311-2

(51) Int. Cl.
| | | |
|---|---|---|
| B22F 3/06 | (2006.01) | |
| C22C 33/02 | (2006.01) | |
| B22F 5/10 | (2006.01) | |
| B29C 41/04 | (2006.01) | |
| H01F 1/26 | (2006.01) | |
| H01F 41/02 | (2006.01) | |
| H01F 1/147 | (2006.01) | |

(52) U.S. Cl.
CPC .............. *C22C 33/0257* (2013.01); *B22F 3/06* (2013.01); *B22F 5/106* (2013.01); *B29C 41/042* (2013.01); *H01F 1/26* (2013.01); *H01F 41/0246* (2013.01); CPC ........... *C22C 2202/02* (2013.01); *H01F 1/14766* (2013.01)
USPC ............... 419/66; 419/65; 335/299; 336/233; 148/104; 148/105; 148/300

(58) Field of Classification Search
USPC ....................... 419/65, 66; 148/104, 105, 300; 335/297, 299; 425/78, 574, 576; 336/233; 252/62.53, 62.55
See application file for complete search history.

(56) References Cited

U.S. PATENT DOCUMENTS

| | | | | |
|---|---|---|---|---|
| 2,304,723 | A | * | 12/1942 | Herrman et al. ................. 419/38 |
| 2,435,227 | A | * | 2/1948 | Lester ............................ 264/667 |
| 3,365,351 | A | | 1/1968 | Maaz et al. |
| 3,985,588 | A | | 10/1976 | Lyman |
| 6,284,060 | B1 | * | 9/2001 | Matsutani et al. ............ 148/300 |
| 2005/0007232 | A1 | * | 1/2005 | Ono et al. ...................... 336/213 |

FOREIGN PATENT DOCUMENTS

| | | |
|---|---|---|
| EP | 0318252 A2 | 5/1989 |
| EP | 1722457 A2 | 11/2006 |
| GB | 2130138 A | 5/1984 |
| JP | 55098814 A | 7/1980 |
| JP | 7-307236 A | 11/1995 |
| JP | 11273980 | * 10/1999 |
| JP | 11273980 A | 10/1999 |
| JP | 2003-328005 A | 11/2003 |
| JP | 2005-248217 A | 9/2005 |
| WO | 9911448 A1 | 3/1999 |

* cited by examiner

OTHER PUBLICATIONS

Machine translation of JP07-307236, published Nov. 21, 1995.*

*Primary Examiner* — George Wyszomierski
*Assistant Examiner* — Ngoclan T Mai
(74) *Attorney, Agent, or Firm* — Capitol City TechLaw (57) ABSTRACT

A process for production of a packed soft magnetic component, comprises the steps of:—preparing a rotational mold, consisting of at least one mold cavity connected to a driven rotational axle, arranging a coil in the mold, filling the at least one mold cavity with a binder and a soft magnetic, metallic material in the form of a powder,—driving the axle for rotation of said at least one mold, whereby the soft magnetic, metallic material is packed by centrifugal forces to one side of said at least one mold cavity, mixed with the binder, thus forming a component comprising a soft magnetic composite with a coil embedded therein.

5 Claims, 5 Drawing Sheets

POWDER BASED SOFT MAGNETIC INDUCTIVE COMPONENT, AND A METHOD AND A DEVICE FOR PRODUCTION THEREOF

TECHNICAL FIELD

The present invention relates to the field of soft magnetic composites, and in particular to a process and an apparatus for manufacture of components consisting of soft magnetic composites. The invention also relates to products directly obtainable with such a method.

TECHNICAL BACKGROUND

A major part of today's advanced industrial products use some sort of electro magnetic energy converters, for example electrical motors, loudspeakers, microphones, sensors and actuators for opening/closing slides (e.g. DVD players), feeding bank notes (cash dispensers) etc.

Almost all of these are standard motors/components of very conventional type where the production methods and possibilities of integrating components within a product haven't been developed much during the last century.

Conventional motor manufacturing involves the punching and stacking of transformer sheets. Since the cost of punches is high, the production volumes must be considerable to have acceptable production costs. Further, since only a two-dimensional magnetic flux can exist in a machine using stacked transformer sheets, the complexity of the electric circuits will have to be high, resulting e.g. in a lot of interconnected coils, often wound directly on the motor teeth. In order to produce such a machine, a lot of manual work has to be done, making them expensive.

The highest possible frequency that can be used in a transformer sheet machine is given by the thickness of the individual transformer sheets. Using less than 0.2 mm thickness will result in a very expensive machine, thus disqualifying reasonably priced machines for designs with high speeds or/and high pole number.

Another example having essentially the same drawbacks as the electrical motors is conventional inductors, chokes etc., the important difference being, that since the permeability of most used inductor core materials is rather high, an air-gap has to be introduced in order not to saturate the core material. If the coils are wound over the air-gaps there will often be considerable fringing losses, resulting in a hot-spot which can be hard to cool.

Also conventional induction heating coils display a related problem. These coils are, almost without exception, built with liquid cooled copper tubes. The copper tubes will have very limited effective current-conducting area due to the skin effect at high frequencies. This naturally results in low efficiency, but even worse, the total resulting flux will not be able to penetrate the copper tubes, thus resulting in induction heating of the tubes. Further, the manufacturing of the copper tubes is time consuming manual labour.

A first step towards an elimination or alleviation of all of the above problems has emerged during the last decade, with the birth of a new material technology. This new material technology provides almost unlimited possibilities to specially adapt, optimize and integrate these types of actuators in consumer products as well as industrial products. The material technology in question is composites of soft magnetic metallic materials with varying amount of binder and filler, named Soft Magnetic Composites, SMC. The forming of these components made of SMC is of great interest, since the demands on high density and design freedom are in conflict with the known manufacturing methods. A successful forming process will result in an energy converter, which in many ways is superior to conventional ones in terms of lower losses, smaller size, a more compact integration in the driven device/product.

The present invention aims at providing a new and improved method and apparatus for production of SMC-components, as well as SMC-components manufactured with such a method.

SUMMARY OF THE INVENTION

One aspect of the invention is a method and apparatus for production of a powder based, soft magnetic, inductive component, comprising rotational casting in a mould. The mould may in some embodiments form part of the final product. The produced component may form part of, or constitute, a complete electro magnetic energy converter, for example; an electrical motor, a generator, an induction coil, an inductor, a magnetic forming coil, a solenoidal actuator (rotational or translational motion) containing one or more electrical windings.

This can be compared with the most common method today to compact and give the final shape to a SMC component is to use uniaxial pressing, but also methods like injection moulding, isostatic pressing and extrusion are used. For uniaxial and isostatic pressing there is limited design freedom of the product and it is not possible to integrate components, i.e. sensors, electronic boards, directly in the pressing of the produced product. Extrusion is used to form the SMC but also this method does not allow integration of other components in the produced product. Extrusion also limits the design freedom of the product. Injection moulding allow some design freedom and the possibility to integrate components but the SMC is not compacted enough resulting in low permeability.

Another aspect of the invention is the product manufactured in the above method and apparatus.

A process or apparatus in accordance with the invention enables an optimal manufacturing of soft magnetic powder composites, SMC. SMC consist of soft magnetic particles, sometimes coated to minimize electrical conductivity, and a binder, preferably a polymer. The invention is based upon rotational moulding, which is a production method mainly used in the plastics industry. An inventive apparatus may comprise one or several mould cavities mounted on carriers that can be rotated around one or several axes. Heating of the mould cavity, if needed, can for example be accomplished by induction heating, to keep cycle times short, while cooling, if needed, can be accomplished by water spray or by air. The mould cavity may be filled stationary or during rotation. The mould cavity may even be filled during rotation, with the polymer first and the metal particles after that. The physical conditions during the process will provide for optimal mixing proportions. During rotation, the heavier metal particles will be pushed outwards from the spinning centre, due to the centrifugal forces, while the polymer with a lower density will be pushed inwards, towards the centre of rotation.

Thereby a high packing degree is achieved. The result is a cast soft magnetic component with a maximized powder packing degree, in the interval 50-80 volume % (given the conditions that the particles are spherical, different particle size fractions are mixed and that no deformation of the particles takes place under the packing process) independent of the initial mixing ratio. The powder packing degree is here defined on the basis of homogenous, rotational cast SMC portions of the finished product, as the volume of soft magnetic powder divided by the total volume of such a SMC portion.

By using the invention, the possibility to produce everything from simple to very complex soft magnetic components in one piece, is reached. Compared to other production processes product features can be integrated already in the casting phase, for example embedded motor brackets, threads, bearings, coils, various sensors, microprocessors, power electronic components, permanent magnets etc. The size of the component can also be varied within a wide range.

DETAILED DESCRIPTION OF PREFERRED EMBODIMENTS

Figure 1:
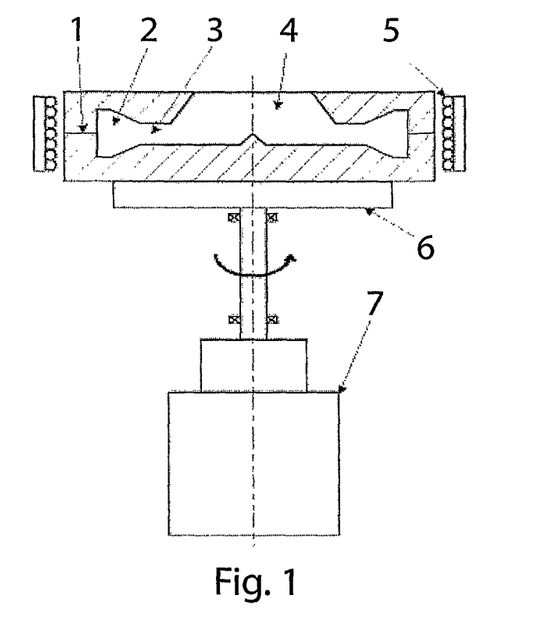
FIG. 1 illustrates schematically a partial cross section of casting equipment in accordance with one aspect of the invention.
Figure 5:
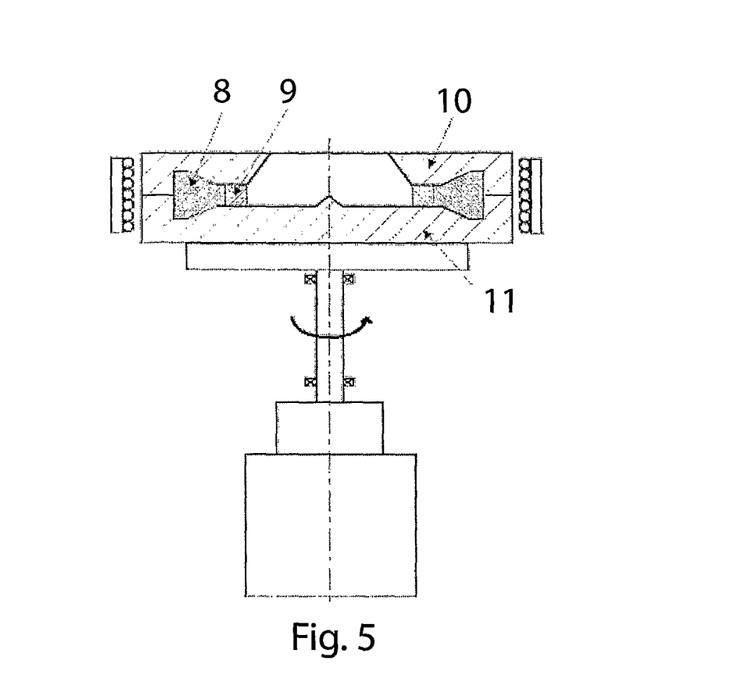
FIG. 5 is a cross sectional view of a filled mould cavity in a casting apparatus of FIG. 1, during rotation.

FIG. 1 and FIG. 5 illustrate an apparatus according to a first embodiment of the invention. It comprises a table 6, which can be set in rotation. Fixed to the table is a lower 11 and an upper 10 mould part, separated by one or more parting lines 1. Put together the mould parts define mould cavity 2, a runner 3 and a pouring basin 4. The table 6 is driven to rotate by means of a motor 7.

Heating means, such as inductive heaters 5 may be arranged for heating the mould, if required. Inductive heating has an advantage in that the heaters 5 may be stationary, while the mould 10, 11 is rotating at desired speed. If required, the mould 10, 11 can be cooled with a water spray. A reason for heating the mould during rotation may be that the material in the cavity 2 needs heat to solidify before the mould can be stopped, i.e. that an interruption of rotation would lead to deformation of a product, which is formed in the cavity. A reason for cooling is to reduce cycle time before the mould can be open after solidification. During rotation the material is accumulated as far from the rotational centre as possible, basically in the direction of the component of the downwardly directed gravitational force and the centrifugal force directed perpendicularly away from the rotational axis. This obviously means that if the rotation stops, the centrifugal force will equal zero, and only the gravitational force will affect any viscous material in the cavity, with the above consequences.

Figure 6:
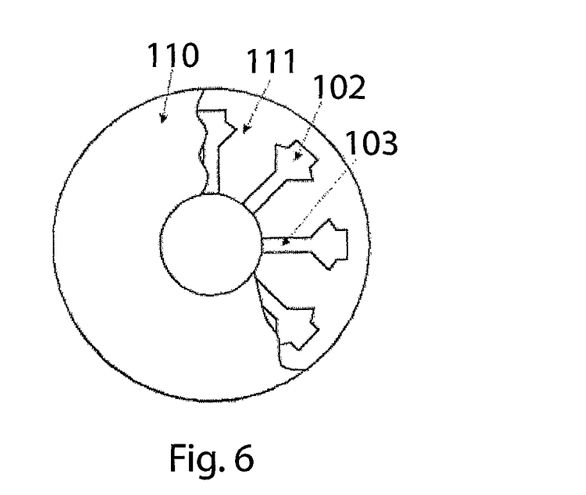
FIG. 6 shows upper and lower moulds for a moulding tool with 8 mould cavities, for a casting equipment of FIG. 1, the upper mould being partly cutaway to reveal the lower mould.
Figure 7:
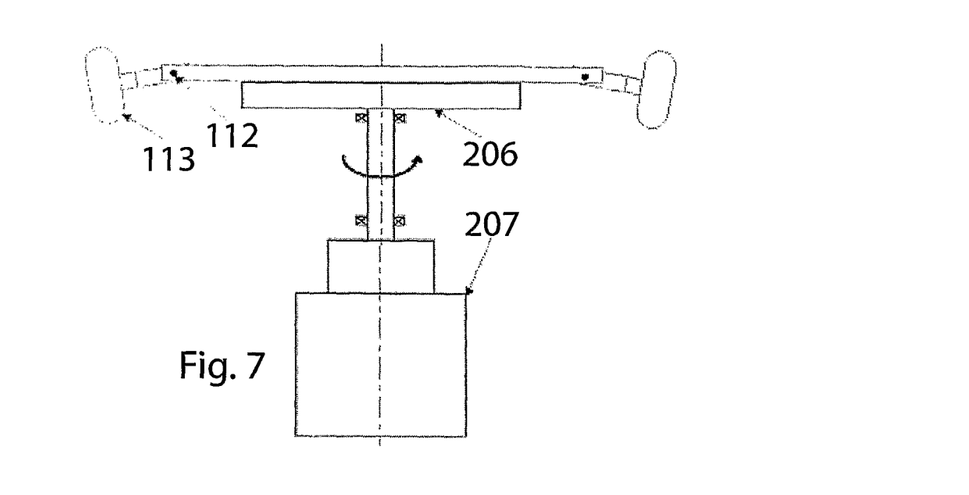
FIG. 7 illustrates the apparatus of FIG. 2, under rotation.

The apparatus can consist of one or several mould cavities depending on the size and complexity of the produced component. FIG. 6 illustrates a tool with multiple mould cavities 102 within an upper 110 and lower 111 mould part.

Before starting the process any integrated components may be positioned in the mould cavity 2. Depending on product there is one or several components integrated in the mould cavity before adding the composite material. Examples include inductors where the coil and brackets are integrated in the mould before adding the SMC material, electrical motors where coil, various sensors, bearings, brackets, microprocessors, power electronic components are integrated in the mould before adding the SMC material, induction heating units where coils, brackets, various sensors and cooling system are integrated in the mould before adding the SMC material.

The casting process starts with putting the mould into rotation and placing a composite material, consisting of soft magnetic particles and a binder, preferably a polymer material, into the cavity. The tool may be heated when the rotation starts, or be heated during the rotation. The rotation causes a centrifugal force, which pushes the composite material, in a viscous fluid form, out towards the perimeter of the mould cavity.

The rotation in combination with as suitable composite material results in an intermediate product with a portion having maximum particle packing degree (8), where the soft magnetic particles are accumulated, and a portion with low particle packing degree (9), where the binder not filling voids between particles is accumulated.

The rotational speed in combination with the radial distance to the centre of rotation must be sufficient enough for the composite material to be pressed radially against the mould, that means that the centrifugal acceleration must exceed 1 G, typically 10-200 G, in extreme cases up to 1000 G.

When the mould cavity is filled and when the material has reached the desired particle concentration, the cavity is heated and subsequently cooled, if this is required to get the used binder to solidify rapidly. When the SMC material has solidified the rotation stops and the demoulding produce the finished part complete with integrated components.

FIGS. 2, 3, 7 and 8 illustrates some aspects of an apparatus according to a second embodiment of the invention. This alternative design of the apparatus comprises a carrier table 14, which can be set in rotation via a rotational axle. On the carrier table 14 a number of casting moulds 13, mould cavities are arranged, freely movable around a pivoting shaft 12, at least in a direction in a plane comprising the rotational axis. The casting moulds may be for one-time use, see FIG. 3, or adapted for multiple castings, see FIG. 8. The process starts by placing a composite material, consisting of soft magnetic particles and a binder of preferably a polymer material, into the cavity and putting the carriers into rotational motion. The rotation causes a centrifugal force, which turns the mould around the pivoting shaft and pushes the composite material, in fluid form, towards the bottom of the mould cavity. When the mould cavity is filled and when the material has reached the desired particle concentration the rotation is stopped and the mould returns to its initial position. The mould is put in an oven for curing, if this is necessary.

Figure 2:
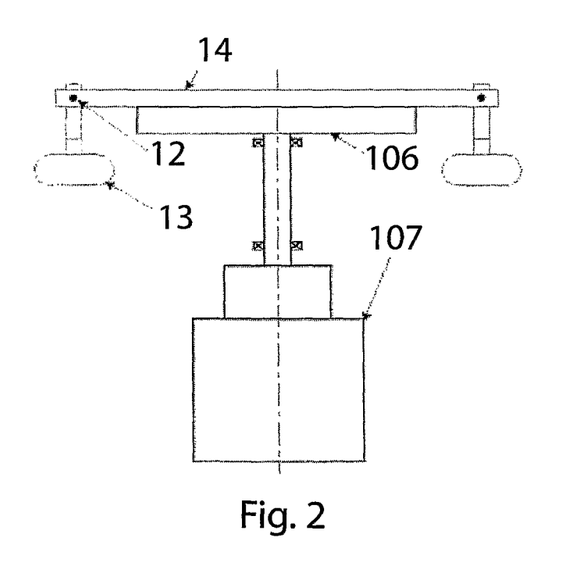
FIG. 2 illustrates schematically casting equipment in accordance with a second aspect of the invention.

The use of carriers and casting moulds that can be mounted before rotation and removed after the rotation has stopped has an advantage in that it makes heating during the rotation process unnecessary. Casting moulds can be prepared outside the apparatus and the rotational process, which increase the possible up-time of the inventive process and apparatus according to this embodiment. Basically, the mould cavities can be filled in a first step, in which they may or may not be attached to the carrier table 14. In a subsequent step they are attached to the rotation axle and rotated. When the rotation stops, the product inside the moulding cavity will not be deformed, since the pivotable mould will adapt its position as the centrifugal forces decrease. The soft magnetic particles will be located, in a well-packed state, in the bottom of the mould cavity and there is no force, under normal circumstances, that forces them to leave that state. The mould cavities can then be removed from the apparatus and cured at another location, if required.

Figure 3:
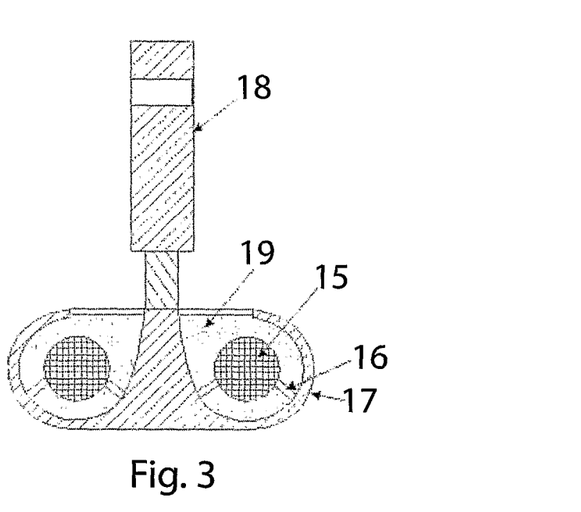
FIG. 3 is a cross section of a mould used for the casting equipment of FIG. 2.

The use of pivoting casting moulds consequently results in a favourable distribution of force in the mould and allows a very uniform packing of the SMC material 19 (FIG. 3) around integrated components 15, 16 (FIG. 3). The force distribution in rotational moulding as such also results in that the particle shape is practically not affected at all, as compared to traditional manufacturing methods where the force distribution is less homogenous.

Figure 8:
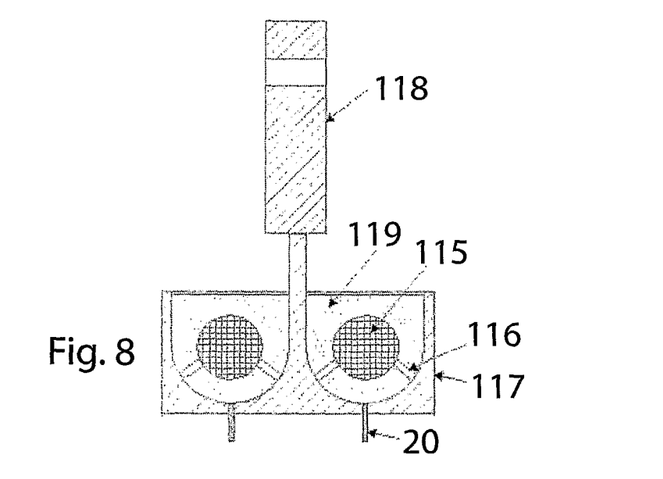
FIG. 8 is a cross-sectional view of a multiple-use casting mould for use in the casting apparatus of FIG. 2.

The third embodiment of the apparatus involves the use of a one-time mould instead of a multiple-use mould. If a multiple-use mould, as illustrated in FIG. 8, is used, demoulding produces the finished part. A one-time mould, as illustrated in FIG. 3, is not demoulded, since it becomes an integrated portion of the finished part. The one-time mould may be produced by any suitable material, but is preferably made of a soft magnetic powder composite material, SMC, with similar composition as the material that will be used in the component. During casting, the one-time mould is fixed in a container, which is mounted on the carrier. Thus, without the necessity of demoulding a finished product with homogenous properties and composition is achieved.

One production issue is the fixation of integrated components in the SMC product. This can be facilitated by manufacture the mould cavity in SMC and include fixation for the integrated components. The mould cavity can e.g. be manufactured in an injection moulding process. Then the integrated components can be easily fixed in the mould cavity. The mould cavity is then filled with SMC and rotated to the final packing density. The mould cavity with the non-hardened SMC can then be hardened in e.g. an oven. The mould cavity, manufactured in SMC, will then become an integrated part of the final product with similar properties as the rotated SMC.

The use of the above described apparatus and process enables the finished product to obtain its final shape in the actual process, without any complicated or cumbersome, work intensive, after processing. Further, the soft magnetic material will get the highest possible particle concentration, given the circumstances, which will result in optimal magnetic properties, meaning that the forces applied during rotation will urge the particles forming the soft magnetic material to settle in a state of minimum energy, i.e. optimal packing. The process, rotational casting or centrifugal casting, provides the possibilities to manufacture everything from simple to very complex soft magnetic inductive components in one single piece. Many product features/components can be integrated already in the casting phase, for example embedded motor brackets, threads, bearings (see 21, FIG. 4), coils (see 15, FIG. 3), various sensors, circuit boards (see 22, FIG. 4), power electronic components etc, some of which are illustrated in a subsequent part of this description.

The soft magnetic powder generally comprises iron (Fe), at least 80%, and silicon (Si) 0%-20%, preferably approximately 6%. The powder is produced through gas atomization, giving it an almost spherical shape. The particle size distribution can be from 0.1 µm to 500 µm. To obtain an optimal packing degree, specific sieved powder size fractions are used. By choosing smaller particle sizes, better high-frequency properties can be obtained, since smaller particles shows full field penetration at higher frequencies and therefore the eddy-current losses are reduced. Yet smaller particles also increase static magnetisation losses. In practice, the preferred sieving fraction is a result of using the full particle distribution apart from the 100-200 µm fraction. This gives a powder packing density of up to 70%, which is close to the theoretical maximum.

The powder is heat treated in a oxygen-reducing or non-reactive atmosphere at temperatures above 700° C. to eliminate possible residual stresses and to achieve a micro structural grain growth.

The high-frequency properties can be enhanced by coating the particles with a thin electrically insulating layer. The surface coating can then be a mixed oxide, for example phosphate/iron-oxide. This coating is applied using a wet chemical or a wet electrolytic process, if required in combination with heating in a gas atmosphere, for example argon, nitrogen, hydrogen, oxygen/air or different combinations of these.

The role of the polymer binder is to achieve a good mechanical property of the product and also, in the case where no surface coating is used on the metal powder particles, provide electrical isolation between the particles. The polymer is either a thermosetting resin or a thermoplastic resin. The viscosity of the polymer plays an important role in order to achieve higher powder packing densities, which are very important in order to have high magnetic permeability. The viscosity during casting should be in the range of 500-700 mPa s in order to obtain high powder packing degree and a full wetting of the powder particles. A full wetting of the particles also increases the structural and mechanical properties of the produced product. The viscosity for many thermosetting resins are in the required range of 500-700 mPa s at room temperature but for thermoplastic resin the temperature has to be raised 40-60° C. to reach similar viscosity properties. The temperature can be raised using the heating system described in the first embodiment of this invention using for example induction heating. The temperature of the slurry, mix of metal powder particles and polymer binder, can also be raised by raising the temperature of the metal powder. Because the specific heat capacity, $C_p$, for the metal powder is lower than for the polymer heating of the metal powder are able to be used to also heat the polymer.

The products produced with the process and apparatus described herein can have many different shapes and properties. The rotational casting in combination with a SMC material according to the above specifications enable production of a product with a possibility of integrating one or several components in the produced part. The possibility to integrate components can also be done in other production techniques i.e. injection moulding. However the powder packing degree obtained using the present process and apparatus is higher, in the interval of 65-80% by volume (giving the conditions that the particles are spherical, different particle fractions are mixed and that no deformation of the particles takes place under the packing process). Material of this type having this packing degree cannot be used in injection moulding.

A product according to one or more embodiments may also be provided with cooling channels or cooling bodies, which are arranged during the rotational moulding. The cooling channels may be actual piping produced of a soft magnetic material or another material, or simply consist of voids in the moulded product. These voids may be achieved by adding to the mould a structure made of a material, which may be removed after moulding.

EXAMPLES

An electro magnetic energy converter is characterized by one or several electric circuits oriented in a fashion that they mutually exists in the magnetic fields originating from the current circulating in the electric circuits.

A soft magnetic structure can be used to enhance the capacity to conduct the magnetic flow around the circuits. The structure can consist of parts that are fixed or movable relative the circuits and the structure can also contain hard magnetic materials. When the magnetic flux is varying, the soft magnetic conductors are submitted to induced voltage which drives currents which in turn cause resistive losses, i.e. eddy-current losses. Other losses are associated with the changes in magnetic flow, primarily hysteresis losses and anomalous.

The losses are jointly known as magnetization losses. In order to reduce the magnetization losses, the magnetic circuit is traditionally split up in thin layers (laminates) that are electrically isolated and oriented so that the electrical current flows in the plane of the laminate. This method of lamination limits the design freedom of electro magnetic energy converters, whereas the core laminates are stacked side by side and then the coil is wound around the core. This design is common for many inductors, transformers and electrical machines. An alternative method is based on pressing iron powder at high pressures to a solid body which, after subsequent treatment, is provided with an electrical winding. This method is used both for inductors and electrical machines.

An electromagnetic energy converter built according to the inventive process previously described differs from traditional converters and is characterized by:

1. The flux conductor (soft magnetic structure) is manufactured using the described method of rotational casting.
2. The electrical windings are cast into the actual magnetic flux conductor.
3. Other components, such as brackets, sensors, cooling flanges etc may also be cast into the same flux conductor.

Figure 4:
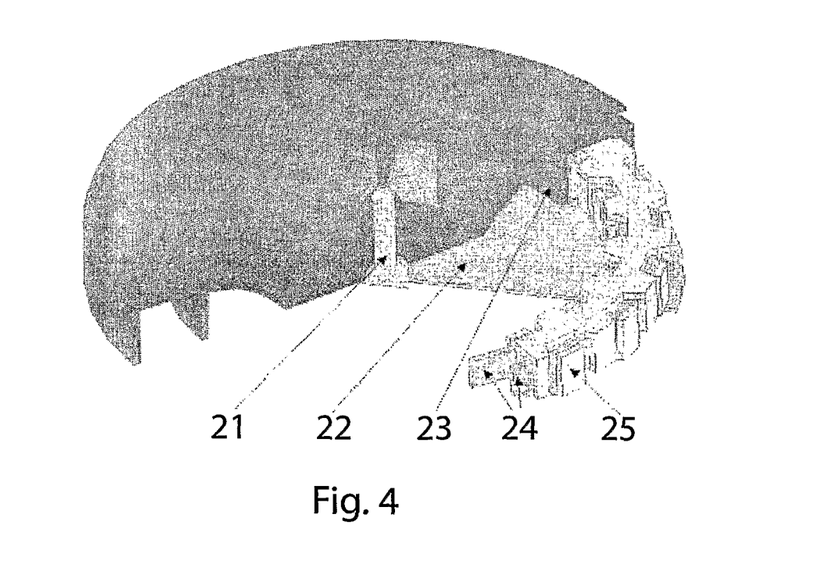
FIG. 4 is a partial cross section/cut-away view of an integrated electrical component, part of a motor, which is possible to achieve directly out of production utilising the invented manufacturing process.

FIG. 4 illustrates an electromagnetic energy converter that includes all the characteristics above. The component of FIG. 4. is a stator of an electrical motor, with an electrical winding 24 surrounded by a complex non-magnetic structure 25, preferably a preformed thermoplastic resin that distributes the SMC material to the correct positions, giving the equivalent air gap. In this product the non-magnetic structure 25 has the same electromagnetic role as an air-gap in a traditional electrical motor design. The electrical winding 24 and polymer gap structure 25 is embedded in and SMC magnetic flux conductor 23. A control system may be provided by the electronics on the integrated electronics board 22. The component is mounted on an axle (not shown) guided by the integrated bearing 21. FIG. 4 illustrates a motor for a fan, and for this reason fan wings are integrated in the mould, as part of the magnetic flux conductor 23. The combination of magnetic qualities, integrated windings and other elements is unique for components produced with this method.

The flux conductor is during the process cast directly onto the printed circuit board. The printed circuit board contains contact areas for the coil, bearing houses, power electronics, motor control, safety circuits (temperature, over-current). Properties: very high torque density, very good high frequency performance, easy to cool since all heat-generating components is thermally coupled to the SMC, very low sound emission (for 6% Si alloy).

The flux conductor 23 is during the process cast directly onto the printed circuit board. The printed circuit board 22 contains contact areas for the coil, bearing houses, power electronics, motor control, safety circuits (temperature, over-current). Characteristic properties of the finished product will be: very high torque density, very good high frequency performance, easy to cool since all heat-generating components is thermally coupled to the SMC, very low sound emission (for 6% Si alloy).

With the inventive process and apparatus it is possible to create complex integrated components with substantially fewer steps than with existing technologies. It is easy to position different components in the mould cavity, for example micro processors (22, FIG. 4), power electronics, sensors, cooling flanges, motor brackets, coils (24, FIG. 4 and 28, FIG. 9), bearings (21, FIG. 4), capacitors etc, which further reduces the production time for the produced product. The complete product is produced directly out of the process and apparatus where conventional production processes include several subsequent operations, i.e. machining, assembling, to achieve a finished product.

As another example the manufacturing of a complete EMC filter including temperature range control, inductors, capacitors, wiring, terminal board, and mounting brackets may be performed in one single operation using the process and apparatus described herein.

Other examples of potential components that can be manufactured using the inventive process and apparatus are components in electrical machines (motors, generators, solenoidal actuators (rotating and translating motion)) containing one or several electrical windings, induction heating coils, magnetic forming coils, and different kinds of inductors.

The SMC-based inductive components manufactured using the material and method described herein can have a high degree of parts integrated in the mould. This is not only advantageous in reducing manufacturing time but it gives a complete new possibility to design electromagnetic energy converters.

The integration of sensors allows for positioning sensors close to the measurement point without affecting the performance of the component. For example temperature sensors can be positioned in the hot spot of the component without having to drill holes in the flux conductor and affecting the magnetic properties. In induction heating units both temperature sensors and positioning sensors can be integrated directly in the heating unit enabling measurement very close to the heated object instead of doing separate mounting facilities with the problem of getting close to the desired measuring point.

Most electromagnetic energy converters are parts of machines and equipment. As such the energy converters are mounted in many different ways. For traditional energy converters fasteners has to be applied in several production steps and not in a favourable place out of electromagnetic aspects. The present invention enables a construction of parts that include these features in an optimum way. The integration of machine elements, i.e. bearings, bearing houses, brackets, fasteners and connectors gives a ready-to-use component, which basically can be put in place directly out of the manufacturing when using a method and apparatus according to this document.

All electronic equipment and wires transmits electromagnetic energy, which affects surrounding equipment and people. Increasing use of power electronics has raised the importance of electromagnetic compatibility, EMC. EMC can be reduced by shielding components with i.e sheet metal. By integrating power electronics the EMC problems are reduced as the SMC acts as a shielding and also, shorter wiring is obtained, a more compact, efficient and readily manufactured product is obtained.

All electromagnetic energy converters have more or less losses resulting in generation of heat. Some products also have favourable running parameters when operating at a certain temperature. Traditionally the temperature for these components is regulated with separate systems. However this invention allows for direct integration of systems for heating, cooling and temperature regulation allows for thermal control of the product. The product can also contain embedded control systems etc. which will give the product integrated intelligence and flexibility.

Figure 9:
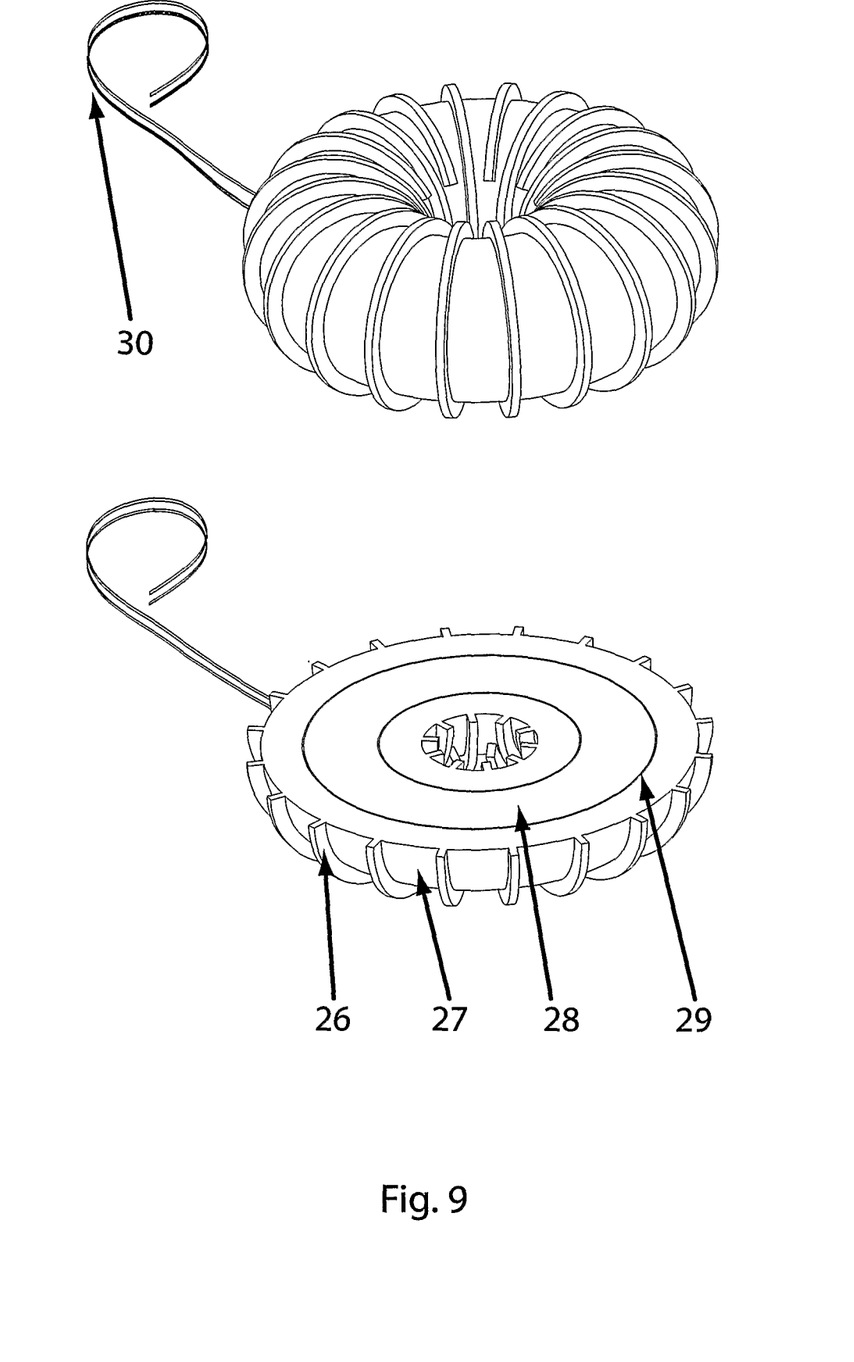
FIG. 9 illustrates schematically the design of an inductive component possible to manufacture with the process and apparatus of the invention.

The product may contain flux conductors of other kinds, wire, laminate, ferrite cubes etc. By integrating other types of flux conductor materials into the powder based flux conductor, specific advantages with the integrated materials can be optimally utilized; for example locally decreased magnetic saturations effects, anisotropic flux conductor properties, locally maximized permeability. A problem that can be identified is magnetic saturation in the teeth of an electric machine, where the solutions can be to locally replace the teeth material with laminated flux conductor material. One example of how this may affect an electronic component This will, if applied to a transformer, minimize the idle current and improve the coupling factor, both being crucial parameters for the performance of a transformer. In this way the idle current may be minimized and the coupling factor may be improved FIG. 9 illustrates an inductor manufactured with the inventive method and apparatus. Inductors may be used as electrical filter components between the power net and the electrical equipment connected to the net. The inductor comprises a litz coil, gas atomized powder in a slurry with polymer binder and has the possibility to integrated temperature sensors etc. Properties of the components; very high energy-to-volume ratio, small losses at high frequencies, low leakage fields, very low sound emission (for 6% Si alloy). A typical component has an outer diameter of 120 mm, a total weight of 2.5 kg and has 12 rounds on the coil giving a total of 42.5 mm$^2$ of copper. The inductor is used for 170 $A_{RMS}$ with an inductance of 35 mH, The losses are in total 50 W equally divided in the coil and in the magnetic flux conductor.

In another embodiment, reinforcement structures are embedded in the soft magnetic component. The reinforcement structure may be in the form of fibers, discrete or in a woven or non-woven form. The reinforcement structure may be applied as a sandwich structure, such that the production process involves alternately arranging a soft magnetic component and a reinforcement structure in the mould. The use of a reinforcement structure may enhance the mechanical strength of the product, e.g. so as to allow faster rotation, etc. Numerous materials for the reinforcement structure are obvious to the skilled person presented with the teachings of this description, and examples include glass fibre, carbon fibre, aramid fibre, etc.

The invention thus encompasses a wide area, basically the whole applicable area for the inventive process. Examples include (some of which have been described before), products:

With powder based soft magnetic component with integrated coil manufactured in a mould which is a integrated part of the final product.

Where the soft magnetic powder comprises iron, at least 80%, and Si 0%-20%, preferably 6% Si.

Where the powder is gas atomized.

Where the casting mould is manufactured in soft magnetic material.

Where the product also contains hard magnetic material or a hard magnetic unit.

Where the product contains sensors.

Where the product contains machine elements, for example bearings, brackets, connectors.

Where the product contains power electronics

Where the product contains control systems.

Where the product contains a discrete soft magnetic material or flux conductors of other kinds, wire, laminate, ferrite cubes etc.

Such as:

Inductive components containing electrical wiring/wirings, inductance.

Components in an electrical machine (motors, generators, solenoidal actuator (rotating och translating motion)) containing one or several electrical windings.

Induction heating coils, magnetic forming coils.

These are just some examples of cases where the properties of the product manufactured with the method provide superior performance of the product, as compared to prior-art. All products described products may preferably, but not necessarily, be manufactured with the inventive method. Certain properties may be improved if rotational casting is used, as has been described earlier in the application.

The invention claimed is:

1. A process for production of a packed soft magnetic component, the process comprising:
preparing a mould having at least one mould cavity and being connected to an axle,
arranging a coil in the mould,
filling the at least one mould cavity with a binder and a soft magnetic, metallic material in the form of a powder,
driving the axle to rotate the mould,
whereby the soft magnetic, metallic material is packed by centrifugal forces to one side of the at least one mould cavity, mixed with the binder, thus forming a component comprising a soft magnetic composite,
wherein the mould is pivotably connected to the axle, such that the mould cavity pivots in response to the centrifugal forces, and
wherein the mould comprises a soft magnetic composite, such that at least a portion thereof, constitutes an integrated part of the soft magnetic component.

2. The process of claim 1, further comprising:
prior to filling the mould cavity, arranging further components in the mould, the further components being selected from the group consisting of a discrete soft magnetic component; a discrete hard magnetic component; a discrete component that does not conduct current or magnetic fields; a sensor; an electronic component; a circuit board; a cooling channel or cooling body; a heat sink; a reinforcement, fiber, technical fabric; a mounting bracket; a fixation element, for fixation of components; and combinations thereof.

3. The process of claim 1, wherein the binder is a polymer binder.

4. The process of claim 1, wherein the soft magnetic component comprises spherical particles.

5. A process for production of a packed soft magnetic component, the process comprising:
preparing a mould having at least one mould cavity and being connected to an axle,
arranging a coil in the mould,
filling the at least one mould cavity with a binder and a soft magnetic, metallic material in the form of a powder,
driving the axle to rotate the mould,
whereby the soft magnetic, metallic material is packed by centrifugal forces to one side of the at least one mould cavity, mixed with the binder, thus forming a component comprising a soft magnetic composite, wherein the mould comprises a soft magnetic composite, such that at least a portion thereof, constitutes an integrated part of the soft magnetic component.

* * * * *